(12) United States Patent
McFarthing

(10) Patent No.: US 8,908,803 B2
(45) Date of Patent: Dec. 9, 2014

(54) NEAR FIELD COMMUNICATIONS TRANSMITTER

(75) Inventor: Anthony McFarthing, Ely (GB)

(73) Assignee: Cambridge Silicon Radio Limited, Cambridge, Cambridgeshire (GB)

( * ) Notice: Subject to any disclaimer, the term of this patent is extended or adjusted under 35 U.S.C. 154(b) by 0 days.

(21) Appl. No.: 13/536,513

(22) Filed: Jun. 28, 2012

(65) Prior Publication Data

US 2013/0003892 A1    Jan. 3, 2013

(30) Foreign Application Priority Data

Jun. 29, 2011   (GB) .................................. 1111038.4

(51) Int. Cl.
*H04L 27/12*    (2006.01)
*G06K 7/10*    (2006.01)

(52) U.S. Cl.
CPC .................................. *G06K 7/10158* (2013.01)
USPC ........................................................ 375/302

(58) Field of Classification Search
USPC ......................................... 375/298, 295, 302
See application file for complete search history.

(56) References Cited

U.S. PATENT DOCUMENTS

| | | | |
|---|---|---|---|
| 7,526,266 B2 | 4/2009 | Al-Mahdawi | |
| 8,233,872 B2 | 7/2012 | Nagai et al. | |
| 8,285,214 B2 | 10/2012 | Sadeghfam et al. | |
| 8,351,850 B2 | 1/2013 | Van Aken et al. | |
| 8,606,212 B2 | 12/2013 | Sheikholeslami | |
| 2003/0054788 A1 | 3/2003 | Sugar et al. | |
| 2005/0096000 A1* | 5/2005 | Petrovic et al. ................ | 455/255 |
| 2006/0098765 A1 | 5/2006 | Thomas et al. | |
| 2006/0158165 A1 | 7/2006 | Inn et al. | |
| 2009/0075591 A1* | 3/2009 | Murdoch et al. ............. | 455/41.1 |
| 2009/0278685 A1 | 11/2009 | Potyrailo et al. | |
| 2009/0295344 A1 | 12/2009 | Qu | |
| 2010/0002803 A1 | 1/2010 | Murdoch et al. | |
| 2010/0054350 A1* | 3/2010 | Kojima ......................... | 375/260 |
| 2012/0105029 A1 | 5/2012 | Kawagoe | |
| 2012/0322399 A1 | 12/2012 | Sheikholeslami | |
| 2013/0017782 A1 | 1/2013 | Tay et al. | |
| 2013/0021012 A1 | 1/2013 | Oddoart et al. | |

FOREIGN PATENT DOCUMENTS

| | | |
|---|---|---|
| DE | 102012012099 A1 | 12/2012 |
| DE | 102012013632 A1 | 1/2013 |
| DE | 102012013120 A1 | 3/2013 |
| EP | 0515187 A3 | 11/1992 |

(Continued)

OTHER PUBLICATIONS

United Kingdom Intellectual Property Office Search Report for Application No. GB1111038.4 dated Oct. 8, 2012.

(Continued)

*Primary Examiner* — Khai Tran
(74) *Attorney, Agent, or Firm* — K&L Gates LLP

(57) ABSTRACT

The present application relates to a near field communications (NFC) transmitter (10) that is configured to modulate a carrier signal with a data signal using a quadrature modulator (12). A delay is introduced into the data signal, and this delayed version of the data signal is input to the input ports of the quadrature modulator (12). The resulting I and Q signals are combined to generate an output signal that is modulated in both amplitude and phase. An NFC receiver receiving the signal transmitted by the transmitter (10) is able to recover the data signal even when the amplitude of the received signal is greatly compressed, as the phase modulation of the transmitted signal is unaffected by the compression associated with power harvesting.

12 Claims, 3 Drawing Sheets

(56) References Cited

FOREIGN PATENT DOCUMENTS

| | | |
|---|---|---|
| EP | 2221984 A1 | 8/2010 |
| GB | 2428940 A | 2/2007 |
| GB | 2484103 A | 4/2012 |
| GB | 2491883 A | 12/2012 |
| GB | 2492362 A | 1/2013 |
| GB | 2493000 A | 1/2013 |
| GB | 2497775 A | 1/2013 |
| WO | WO 2006/076669 A1 | 7/2006 |
| WO | WO 2006/088583 A2 | 8/2006 |
| WO | WO2009/128032 A1 | 10/2009 |
| WO | WO 2010/041173 A1 | 4/2010 |

OTHER PUBLICATIONS

United Kingdom Intellectual Property Office Examination Report for Application No. GB1111038.4 dated Oct. 9, 2012.

* cited by examiner

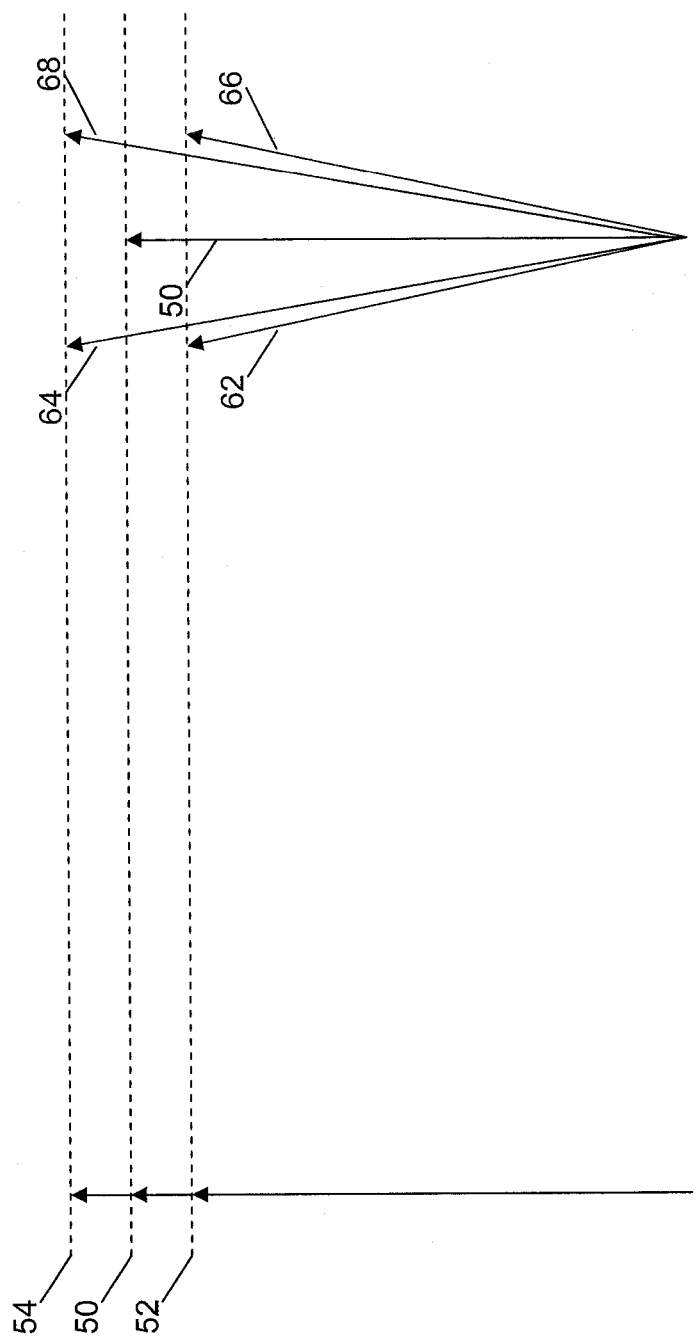

NEAR FIELD COMMUNICATIONS TRANSMITTER

CROSS REFERENCE TO RELATED APPLICATION

This application claims priority under 35 U.S.C. §119 of United Kingdom Application No. GB1111038.4, titled "A NEAR FIELD COMMUNICATIONS TRANSMITTER," filed Jun. 29, 2011, and incorporated herein by reference in its entirety.

TECHNICAL FIELD

The present application relates to a transmitter for generating a near field communications signal, to a method for generating a near field communications signal, and to a near field communications signal.

BACKGROUND TO THE INVENTION

Near field communications (NFC) devices are used for short range (typically of a few centimeters) transmission and reception of data. In a typical NFC interaction, an NFC reader transmits a signal that can be detected by an NFC tag. The NFC tag responds by generating a response signal that can be detected by the NFC reader Typically the NFC reader is a powered device that generates a carrier signal onto which a data signal is modulated, and transmits the modulated carrier signal via an antenna of the NFC reader. This carrier signal is detected by an antenna of the NFC tag, which may be an active (i.e. powered) device, or may be a passive (i.e. unpowered) device.

NFC communications operate by magnetic coupling of the antenna of the NFC reader with the antenna of the NFC tag. When a signal is transmitted by the NFC reader, a magnetic field develops around its antenna, and this magnetic field couples to the antenna of the NFC tag, generating a voltage across the antenna of the tag.

A popular modulation scheme for NFC communications systems is known as 14443B amplitude modulation, in which the data signal to be transmitted is amplitude modulated onto the carrier signal generated by the NFC reader with a modulation depth as low as 10 percent. In the tag, the envelope of the amplitude modulated signal is detected to demodulate the data signal modulated onto the carrier. However, energy must also be harvested from the signal received by the tag, and the energy harvesting circuitry used in the tag has the effect of compressing the signal received by the tag, which effectively reduces the modulation present in the received signal, thereby making it difficult or even impossible to demodulate the data signal.

One possible solution to this problem is the addition of a high gain amplifier with automatic gain control to the NFC reader, to amplify the signal received by the receiver to a level at which the modulation present can be detected and demodulated to recover the transmitted data signal. However, it will be appreciated that this approach is limited by the degree of signal compression.

SUMMARY OF INVENTION

The present application relates to a near field communications (NFC) transmitter that is configured to modulate a carrier signal with a data signal using a quadrature modulator. A delay is introduced into the data signal, and this delayed version of the data signal together with the original signal is input to the input ports of the quadrature modulator. The resulting I and Q signals are combined to generate an output signal that is modulated in both amplitude and phase. An NFC receiver receiving the signal transmitted by the transmitter is able to recover the data signal even when the amplitude of the received signal is greatly compressed, as the phase modulation of the transmitted signal is unaffected by the compression associated with power harvesting.

According to a first aspect of the present invention there is provided a near field communications (NFC) transmitter, the transmitter comprising: a signal generator for generating a carrier signal; means for generating a data signal; means for delaying the data signal; and a modulator for modulating the carrier signal with the original data signal and the delayed version of the data signal.

The signal generated by the NFC transmitter includes a phase modulated data signal that can be detected and demodulated even where the receiver compresses the amplitude of the received signal to a very large extent. The signal generated by the NFC transmitter complies with existing NFC specifications, so is backwards compatible with existing NFC receivers, such that existing NFC receivers without a quadrature demodulator operate normally with the new modulation scheme. Receivers fitted with either quadrature demodulators or phase detectors benefit greatly from the extra impressed phase modulation. Thus, the NFC transmitter and the modulation scheme used offer the benefit of improved reception for some NFC receivers and produce no unwanted effects in the rest.

The means for delaying the data signal may comprise a delay element.

In some embodiments the delay element may be configured to delay the data signal by between 0.125 and 0.5 of a symbol period of the data signal. However, delays outside this range may also be used in some situations.

The modulator may comprise a quadrature modulator.

The modulator may be configured to amplitude modulate one of an in-phase and a quadrature version of the carrier signal with the data signal, and to amplitude modulate the other of the in-phase and the quadrature version of the carrier signal with the delayed data signal.

According to a second aspect of the present invention there is provided a method of generating a near field communications (NFC) signal, the method comprising: generating a carrier signal; generating a data signal representing data to be modulated onto the carrier signal; delaying the data signal; and modulating the carrier signal with the original data signal and the delayed data signal.

In some embodiments the data signal may be delayed by between 0.125 and 0.5 of a symbol period of the data signal. However, delays outside this range may also be used in some situations.

The carrier signal may be modulated using a quadrature modulator.

The modulator may be configured to amplitude modulate one of an in-phase and a quadrature version of the carrier signal with the data signal, and to amplitude modulate the other of the in-phase and the quadrature version of the carrier signal with the delayed data signal.

According to a third aspect of the present invention there is provided a near field communications (NFC) signal comprising a carrier and a data signal, wherein the data signal is both amplitude and phase modulated onto the carrier.

BRIEF DESCRIPTION OF THE DRAWINGS

Embodiments of the invention will now be described, strictly by way of example only, with reference to the accompanying drawings, of which:

FIG. 2 show a vector representation of an amplitude modulated signal;

FIG. 3 shows a vector diagram of a signal generated by the transmitter of FIG. 1;

DESCRIPTION OF THE EMBODIMENTS

Figure 1:
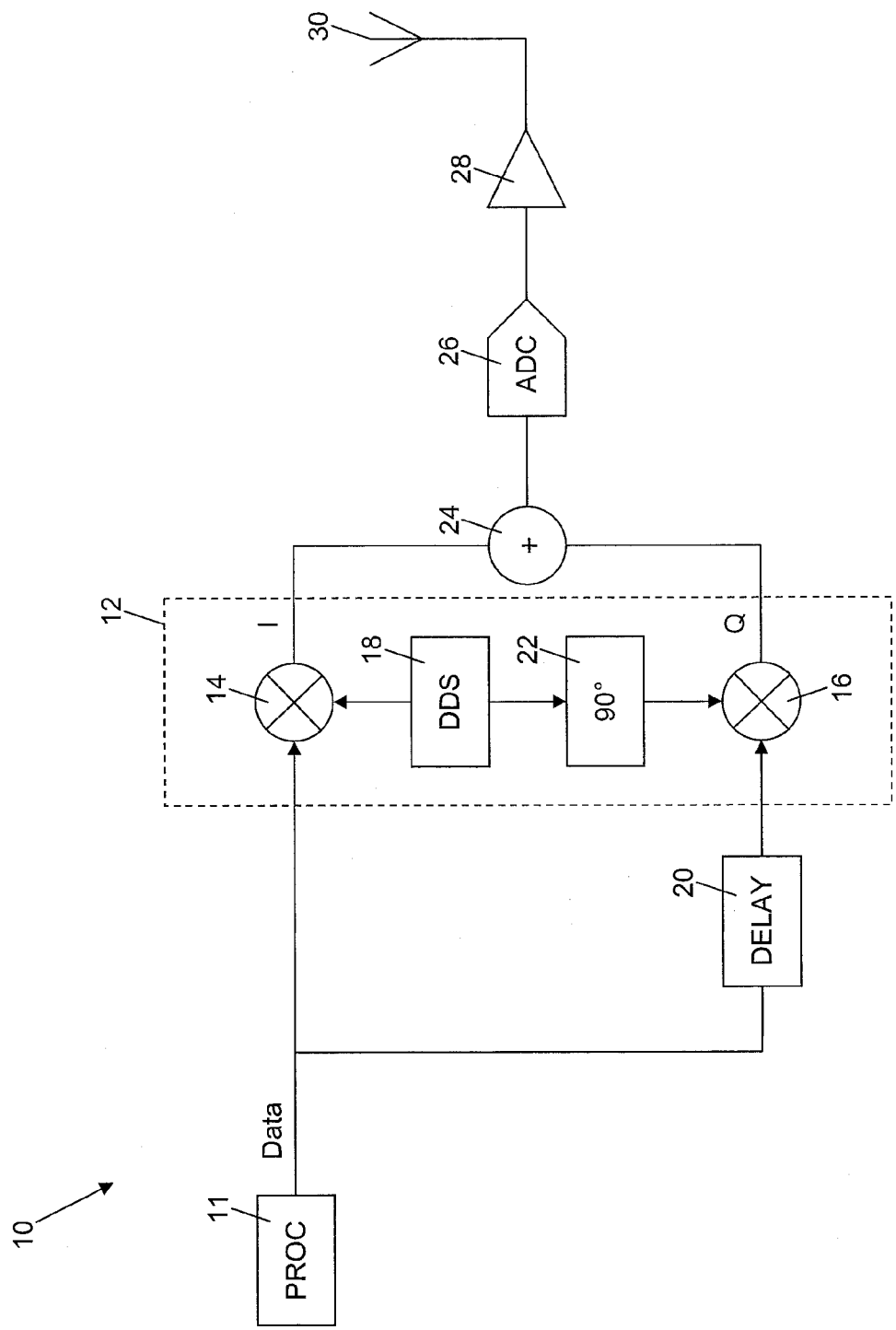
FIG. 1 is a schematic diagram illustrating a near field communications transmitter.

FIG. 1 is a schematic block diagram showing part of a transmitter for use in a near field communications (NFC) device. It will be appreciated that the functional blocks shown in FIG. 1 do not necessarily represent physical components of a transmitter, but instead represent functions that are performed by the transmitter. In practice, the transmitter may be implemented in many different ways, for example using discrete components or pre-fabricated circuit elements, using one or more appropriately programmed or configured digital signal processors (DSPs), field programmable gate arrays (FPGAs), application specific integrated circuits (ASICs) or general purpose processors.

The transmitter is shown generally at 10 in FIG. 1, and includes an input which is connected to upstream processing components 11 of the transmitter 10 to receive from the processing components 11 a digital data signal in the form of a stream of digital data symbols representing data to be transmitted by the transmitted.

The transmitter 10 includes a quadrature modulator 12 having first and second mixers 14, 16 and a direct digital synthesiser (DDS) 18. The DDS 18 generates a digital signal to act as a carrier for the data to be transmitted by the transmitter 10. The signal may comprise a single tone at around 13.56 MHz, for example.

The digital data signal is input to a first input of the first mixer 14, whilst a second input of the first mixer 14 is connected to an output of the DDS 18. In this example, the first mixer 14 mixes the data signal with the carrier signal and outputs an in-phase (I) component of an amplitude modulated signal to be transmitted by the transmitter 10.

The data signal is also input to a first delay element 20, which is operative to delay the data signal such that the phase of a signal at the output of the first delay element 20 is shifted with respect to the phase of the data signal input to the first delay element 20. The delay introduced by the first delay element 20 is typically between 0.125 and 0.5 of a symbol period of the data signal generated by the upstream processing components 11, although delay values outside of this range may be used in certain circumstances.

The output of the first delay element 20 is connected to a first input of the second mixer 16. A second input of the second mixer 16 is connected to an output of a second delay element 22, whose input is connected to the output of the DDS 18. The second delay element 22 introduces a phase shift of 90 degrees into the carrier signal, such that a signal output by the second delay element 22 is phase shifted by 90 degrees with respect to the carrier signal.

The output of the second delay element 22 is connected to a second input of the second mixer 16. In this example, the second mixer 16 mixes the delayed version of the data signal with the phase shifted version of the carrier signal and outputs a quadrature (Q) component of an amplitude modulated signal to be transmitted by the transmitter 10.

The outputs of the first and second mixers 14, 16 are connected to first and second inputs of a combiner 24, which combines the I and Q signals output by the first and second mixers 14, 16 to generate a modulated signal to be output by the transmitter 10.

It will be appreciated that the delayed version of the data signal could equally be mixed with the output of the DDS 18 to generate the in-phase component, and the output of the second delay element 22 could be mixed with the data signal to generated the quadrature component of the modulated signal.

The output of the combiner 24 is connected to an input of a digital to analogue converter 26, which converts the modulated digital signal at its input to an analogue output signal, and this signal is amplified by an amplifier 28 and transmitted via an antenna 30 of the transmitter 10.

The first delay element 20 effectively introduces a phase modulation component into the signal transmitted by the transmitter 10, which signal would otherwise be modulated in amplitude only. This effect is illustrated in FIGS. 2 and 3, as is described below.

FIG. 2 is a vector diagram illustrating an amplitude modulated signal. The unmodulated carrier signal is shown as the vector 50. When this carrier 50 is amplitude modulated by a square wave, its position alternates between the upper and lower extreme positions 52, 54.

FIG. 3 is a vector diagram illustrating a signal output by the transmitter 10. As before, the unmodulated carrier signal is shown as the vector 50. When the carrier 50 is both amplitude and phase modulated by the new modulation scheme, as in the receiver 10, the vector alternates between the positions 62, 64, 66, 68.

Figures 4, 5:
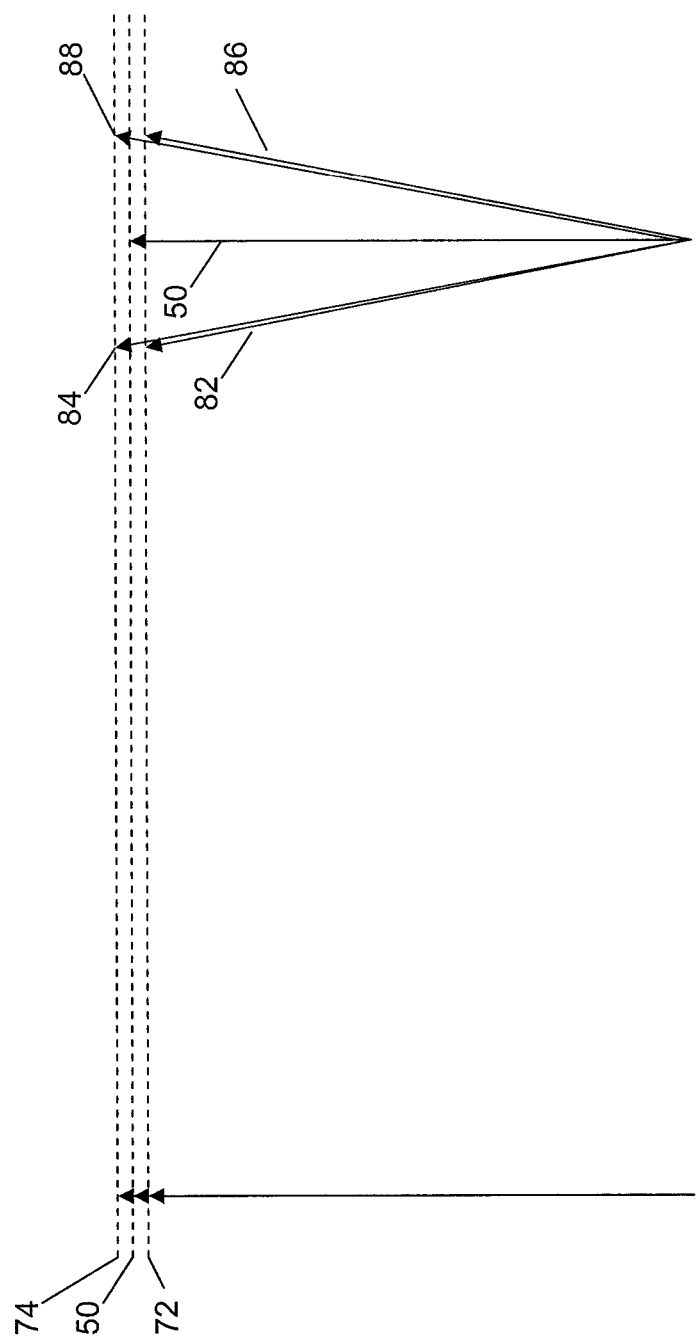
FIG. 4 show a vector representation of an amplitude modulated signal that has been compressed.
FIG. 5 shows a vector diagram of a signal generated by the transmitter of FIG. 1, which signal has been compressed.

The effect of the new modulation component introduced by the delay element 20 on a signal received at a demodulator of an NFC device such as an NFC tag is illustrated in the vector diagrams of FIGS. 4 and 5.

As is explained above, the energy harvesting circuitry used in an NFC tag can have the effect of compressing the amplitude of a signal received by the tag. For a signal modulated only in amplitude this can have the effect of reducing the modulation depth, as illustrated in the vector diagram of FIG. 4, in which the extreme positions 72, 74 of the vector are very close to the vector 50 representing the unmodulated carrier signal. This can make it difficult, if not impossible, to demodulate the received signal.

FIG. 5 is a vector diagram showing a carrier that has the new modulation format compressed by energy harvesting circuitry of an NFC tag. In the vector diagram of FIG. 5, the extreme positions 82, 84, 86, 88 are very close in amplitude to the unmodulated carrier signal 50. However, the phase of the vector at the extreme positions 82, 84, 86, 88 remains essentially unchanged from the signal transmitted. This phase difference can be detected by the receiver and used to demodulate the received signal to recover the transmitted data signal.

It will be appreciated from the foregoing that the NFC signal generated by the transmitter 10 can be used to overcome the problems associated with compression of a received NFC signal at the receiver, as even in cases where the amplitude compression by the receiver is so great that the amplitude modulation cannot be detected, the phase modulation introduced by the first delay element 20 (by delaying the data signal in the quadrature component of the modulated signal to be transmitted) can be detected by an NFC receiver, allowing the data signal to be recovered by the receiver. Moreover, the NFC signal generated by the transmitter 10 complies with current NFC specifications and thus can be detected and demodulated by all existing NFC receivers. NFC receivers (e.g. tags) fitted with a quadrature demodulator or a phase detector can potentially use the new modulation scheme to recover data even when power harvesting may have eliminated all the amplitude modulation generated by the transmitter 10.

The invention claimed is:

1. A transmitter comprising:
   a signal generator for generating a carrier signal;
   means for generating a data signal;
   means for delaying the data signal; and
   a modulator for modulating the carrier signal with the original data signal and the delayed version of the data signal, wherein the transmitter is a near field communication (NFC) transmitter.

2. A transmitter according to claim 1 wherein the means for delaying the data signal comprises a delay element.

3. A transmitter according to claim 2 wherein the delay element is configured to delay the data signal by between 0.125 and 0.5 of a symbol period of the data signal.

4. A transmitter according to claim 1 wherein the modulator comprises a quadrature modulator.

5. A transmitter according to claim 4 wherein the modulator is configured to amplitude modulate one of an in-phase and a quadrature version of the carrier signal with the data signal, and to amplitude modulate the other of the in-phase and the quadrature version of the carrier signal with the delayed data signal.

6. A transmitter according to claim 2 wherein the modulator comprises a quadrature modulator.

7. A transmitter according to claim 3 wherein the modulator comprises a quadrature modulator.

8. A method of generating a signal in a transmitter apparatus, the method comprising:
   generating a carrier signal;
   generating a data signal representing data to be modulated onto the carrier signal;
   delaying the data signal; and
   modulating the carrier signal with the original data signal and the delayed data signal, wherein the transmitter is a near field communication transmitter and is configured to generate a near field communications signal.

9. A method according to claim 8 wherein delaying the data signal comprises delaying the data signal by between 0.125 and 0.5 of a symbol period of the data signal using a delay element.

10. A method according to claim 8 wherein the carrier signal is modulated using a quadrature modulator.

11. A method according to claim 10 wherein the modulator is configured to amplitude modulate one of an in-phase and a quadrature version of the carrier signal with the data signal, and to amplitude modulate the other of the in-phase and the quadrature version of the carrier signal with the delayed data signal.

12. A method according to claim 9 wherein the carrier signal is modulated using a quadrature modulator.

\* \* \* \* \*